(12) United States Patent
Imao

(10) Patent No.: US 6,218,936 B1
(45) Date of Patent: Apr. 17, 2001

(54) TIRE AIR PRESSURE MONITORING SYSTEM

(75) Inventor: Noboru Imao, Kakamigahara (JP)

(73) Assignee: Pacific Industrial Co. Ltd. (JP)

( * ) Notice: Subject to any disclaimer, the term of this patent is extended or adjusted under 35 U.S.C. 154(b) by 0 days.

(21) Appl. No.: 09/382,569

(22) Filed: Aug. 25, 1999

(30) Foreign Application Priority Data

Aug. 25, 1998 (JP) .................................. 10-239096
Aug. 27, 1998 (JP) .................................. 10-241496

(51) Int. Cl.$^7$ .................................. B60C 23/00
(52) U.S. Cl. .................. 340/447; 340/10.4; 73/146.5; 702/138
(58) Field of Search .................. 340/447, 446, 340/448, 10.4; 702/138; 73/146.3, 146.5

(56) References Cited

U.S. PATENT DOCUMENTS 5,463,374 * 10/1995 Mendez et al. .................. 340/447
5,602,524 * 2/1997 Mock et al. .................. 340/447
5,612,671    3/1997 Mendez et al. .................. 340/447
5,924,055 * 7/1999 Hattori .................. 340/447
6,043,738 * 3/2000 Stewart et al. .................. 340/447

FOREIGN PATENT DOCUMENTS

WO 94/20317    9/1994 (WO).

* cited by examiner

Primary Examiner—Daniel J. Wu
(74) Attorney, Agent, or Firm—Trask Britt

(57) ABSTRACT

A tire air pressure monitoring system includes transmitters and a receiver. The transmitters wirelessly transmit data regarding the inner pressure of tires and the receiver receives the data from the transmitters. Each transmitter has its own ID code and includes a pressure sensor for measuring the inner pressure of the corresponding tire. Every time each pressure sensor measures the pressure, the corresponding transmitter generates a time interval by performing a pseudorandom number calculation based on the measured pressure and its ID code. The pressure sensor will measure the pressure each time the obtained time interval elapses. When each pressure sensor measures the pressure for a predetermined number of times, the corresponding transmitter wirelessly transmits data. This system prevents the transmitters from interfacing with one another and facilitates the manufacture of the transmitters.

15 Claims, 6 Drawing Sheets

TIRE AIR PRESSURE MONITORING SYSTEM

BACKGROUND OF THE INVENTION

The present invention relates to an air pressure monitoring system that wirelessly transmits information regarding tire air pressure.

Wireless tire air pressure monitoring systems for allowing a driver in a vehicle passenger compartment to check the pressure of vehicle tires have been proposed. One such monitoring system includes transmitters and a receiver. Each transmitter is located in one of the wheels and the receiver is located in the body frame of the vehicle. Each transmitter detects the pressure of the associated tire and wirelessly transmits the detection information. The receiver receives information from the transmitters and displays the information regarding the pressure of each tire on, for example, a display located in front of the driver's seat.

The transmitters are located in the tires. Each transmitters transmits information regarding the pressure of the associated tire to the common receiver. The receiver must distinguish signals from the tires. Therefore, a transmitter having its own specific ID data, or ID code, has been proposed. The transmitter transmits air pressure data with its own ID code attached, which permits the receiver to identify the transmitter based on the ID codes.

In a typical monitoring system, each transmitter transmits detection data to a receiver at predetermined intervals. The intervals are previously programmed in a microcomputer in each transmitter.

The time intervals stored in each microcomputer have the same fixed value. Therefore, all the transmitters transmit signals at the same time intervals, which increases possibility that two or more transmitters transmit signals at the same time. In this case, the signals interfere with one another, and the receiver cannot properly receive the signals.

A typical automobile has four transmitters, each of which is provided in one of the tires. It has been confirmed that there is a 0.017% chance of interference of signals if each transmitter transmits signals every ten minutes and the duration of each transmission is 192 msec.

As described above, intervals of signal transmissions are fixed and the same for each microcomputer. Thus, once two or more transmitters have the same signal transmission timing, the matched timing will be maintained for relatively long period. Accordingly, the receiver cannot properly receive signals for relatively long time.

To solve this problem, Japanese Unexamined Patent Publication No. 8-505939 discloses a system for differentiating transmission intervals, which are programmed in the microcomputers of the transmitters. This method reduces the chance of coincidence of signal transmissions and prevents matched timings from being maintained. However, programming different interval data to each transmitter is troublesome and is not suitable for mass production of transmitters.

Further, it is impossible to differentiate transmission timings of all the transmitters, which are mass-manufactured. Therefore, two or more transmitters having the same transmission timing may be mounted on one automobile.

ID codes, which are allotted to each transmitter, are useful to identify the transmitters. However, the receiver must be able to distinguish a different ID code from each transmitter. The apparatus of Publication No. 8-505939 executes a registration process for relating the ID code of each transmitter to the position of the associated tire. Specifically, when manufacturing an automobile, the transmitters are actuated by putting a magnet near the tires. The actuated transmitters transmit learning signals, which include an ID code, to the receiver. The ID code of each transmitter is registered in the receiver.

However, the system of Publication No. 8-505939 requires a person to perform the registration process and a special programming tool, or magnet. Therefore, registration of ID codes in the receiver is troublesome. Further, the registration process needs to be performed after a service to the vehicle, such as a change of tires. This complicates the maintenance of the vehicle.

Japanese Unexamined Patent Publication No. 9-210827 discloses a system for automatically renewing ID codes of transmitters registered in a receiver. Specifically, the receiver receives ID codes from four transmitters attached to four tires of a vehicle and stores the received ID codes as main ID codes. When receiving ID codes other than the main ID codes, the receiver stores the received ID codes as backup codes. When the receiver cannot receive one of the main ID code, the receiver deletes that main ID code, or inactive ID code. The receiver then selects an active ID code, which is constantly received, among the backup ID codes and renews the deleted ID code with selected backup ID code.

The system of Publication No. 9-210827 judges that a certain main ID code is inactive when the main ID code has not been received in a relatively short period. Therefore, even if there is no lasting malfunction in a transmitter, for example, if the ID code of the transmitter is not received by the receiver due to an external cause such as fading, the system judges that the main ID code is inactive. The system then replaces the main ID code with a backup ID code, which is actually unnecessary, which hinders proper communication between the transmitters and the receiver.

SUMMARY OF THE INVENTION

Accordingly, it is an objective of the present invention to provide a tire air pressure monitoring system that maintains proper communication between transmitters and a receiver.

Another objective of the present invention is to prevent transmission signals from multiple transmitters from interfering with each other and to facilitate the manufacture of the transmitters.

Another objective of the present invention is to facilitate the registration of the ID codes of transmitters in a receiver and to automatically renew the registered ID codes.

To achieve the foregoing objectives, the present invention provides a transmitter for wirelessly transmitting data regarding the inner pressure of a tire. The transmitter includes a pressure sensor for measuring the inner pressure of the tire, transmitting means for wirelessly transmitting data including the measured pressure, and first commanding means for commanding the pressure sensor to measure the pressure. Every time the pressure sensor measures the pressure, the first commanding means obtains a time interval based on a pseudorandom number calculation using at least data representing the pressure measured by the pressure sensor. The first commanding means commands the pressure sensor to measure the pressure after the computed time interval has elapsed. The transmitter further includes second commanding means for commanding the transmitting means to wirelessly transmit the data every time the pressure sensor measures the pressure for predetermined number of times.

The present invention further provides a method for wirelessly transmitting data regarding the inner pressure of a tire from a transmitter. The method includes measuring the inner pressure of the tire at random time intervals. Each time interval is generated based on a pseudorandom number calculation using at least data representing the measured pressure. The pressure is measured when each time interval elapses. The method further includes wirelessly transmitting data including the measured pressure every time the pressure is measured for predetermined number of times.

In another aspect of the present invention, a tire air pressure monitoring apparatus, which has a plurality of transmitters for wirelessly transmitting data regarding the inner pressures of respective vehicle tires and a receiver for receiving the data wirelessly transmitted by the transmitters, is provided. Each transmitter has its own ID code. The data transmitted from each transmitter represents at least the measured pressure and the ID code. The apparatus includes a memory, an initializing switch and a controller. The memory is located in the receiver. The memory includes a registration ID table for registering the ID codes of the transmitters and reception count values. Each reception count value corresponds to one of the ID codes. Each reception count value is used for judging whether the corresponding ID code registered in the registration ID table is valid. The initializing switch is connected to the receiver. The initializing switch is manipulated for initially registering the ID codes, which are contained in data received by the receiver, in the registration ID table. The controller is located in the receiver. When a registration based on the manipulation of the initializing switch is performed, the controller sets each reception count value, which corresponds to one of the initially registered ID codes, to predetermined maximum count value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 1:
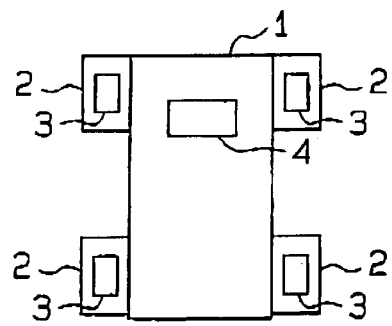
FIG. 1 is a diagrammatic view illustrating a tire air pressure monitoring system according to one embodiment of the present invention.

A tire air pressure monitoring system according to a preferred embodiment of the present invention will now be described with reference to the drawings. As shown in FIG. 1, the tire air pressure monitoring system includes four tires 2 of a vehicle 1, four transmitters 3, each located in one of the tires 2, and a receiver 4 mounted on the body frame of the vehicle. Each transmitter 3 is secured to the wheel of the associated tire 2 such that the transmitter 3 is located within the associated tire 2. Each transmitter 3 detects the air pressure of the associated tire 2 and sends a signal containing the detection information to the receiver 4.

Figure 2:
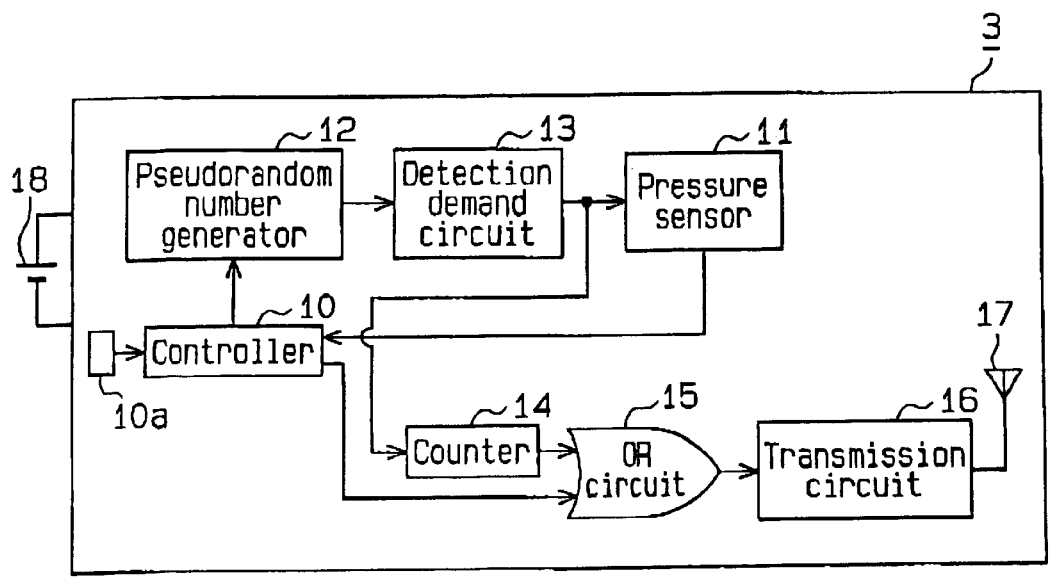
FIG. 2 is a block diagram illustrating a transmitter in the system of FIG. 1.

As shown in FIG. 2, each transmitter 3 includes a controller 10, which is, for example, a microcomputer. The controller 10 includes a central processing unit (CPU), a random access memory (RAM) and a read only memory (ROM). The controller 10 is connected to an ID generator 10a, which generates a specific ID code. The ID code is used to distinguish the associated transmitter 3 from the other three transmitters 3. The ID generator 10a may be included in the controller 10. Alternatively, the ID code may be previously stored in the ROM in the controller 10.

A pressure sensor 11 provided in each tire 2 measures the internal air pressure of the associated tire 2 and sends data representing the detected pressure to the controller 10. The controller 10 sends the received pressure data and the ID code from the ID generator 10a to a pseudorandom number generator 12. The pseudorandom number generator 12 performs a pseudorandom number calculation using the pressure data and the ID code to generate a delay time, and sends a signal representing the delay time to a detection demand circuit 13. The length of the delay time is within a predetermined range (the range is between zero to one second in this embodiment). Thus, the pseudorandom number, which is a value representing the delay time, varies in the predetermined time range in accordance with changes in the pressure data or the ID code.

The detection demand circuit 13 adds the delay time sent from the pseudorandom number generator 12 to a predetermined basic detection interval (fifteen seconds in this embodiment). When the total time (basic interval pulse delay time) has elapsed, the detection demand circuit 13 sends a detection demand signal to the pressure sensor 11. The pressure sensor 11 detects the internal air pressure of the tire 2 in response to the demand signal. Data representing the newly detected air pressure is sent to the pseudorandom number generator 12 via the controller 10. Therefore, the pseudorandom number generator 12 performs a pseudorandom number calculation using the new pressure data and the ID code thereby generating a delay time. Every time the pressure sensor 11 detects the tire pressure, the time interval until the next detection is changed within a range between fifteen seconds and sixteen seconds.

The pseudorandom under calculation performed by the pseudorandom number generator 12 varies the detection interval of the pressure sensor 11 in the range between fifteen seconds and sixteen seconds. In other words, the detection interval is not fixed. Particularly, when the vehicle 1 is moving, the internal pressure in each tire 2 fluctuates. Thus, detection value of the pressure sensor 11 continually changes. Since the pseudorandom number calculation uses the changing detection value, the delay time fluctuates between zero to one second. Accordingly, the detection interval of the pressure sensor 11 fluctuates in the range between fifteen seconds and sixteen seconds.

The detection demand signal from the detection demand circuit 13 is sent not only to the pressure sensor 11 but also to a counter 14. The counter 14 counts the times that the detection demand signal is input, or the number of detections by the pressure sensor 11. The counter 14 clears the count value when the number of signal inputs (the number of pressure detections) reaches a predetermined number (forty in this embodiment) and sends a high (H level) overflow signal to an OR circuit 15.

The OR circuit 15 also receives transmission demand signals from the controller 10. The OR circuit 15 sends a transmission command signal of an H level to a transmission circuit 16 when either the overflow signal from the counter 14 or the transmission demand signal from the controller 10 is high (H level). The transmission circuit 16 generates transmission data in response to a high transmission command signal. The transmission data includes the ID code supplied from the ID generator 10a and the pressure data obtained by the pressure sensor 11. The transmission circuit 16 wirelessly sends the transmission signal to the receiver 4 through a transmission antenna 17. The transmitted pressure data is based on a value detected by the pressure sensor 11 immediately before the transmission circuit 16 receives a high transmission command signal.

If the overflow signal from the counter 14 is a low (L level) when the controller 10 needs to send information to the receiver 4, the controller 10 changes the transmission demand signal to a high level. For example, if the air pressure in one of the tires 2 is abruptly changes, the controller 10 changes the transmission demand signal to a high level.

Therefore, the pressure data is transmitted every fortieth time the pressure sensor 11 detects the pressure unless the transmission demand signal from the controller 10 becomes high.

The transmitter 3 is driven by electricity from a battery 18. An initial detection of pressure by the pressure sensor 11 is performed, for example, when the transmitter 3 is turned on by the battery 18.

Figure 3:
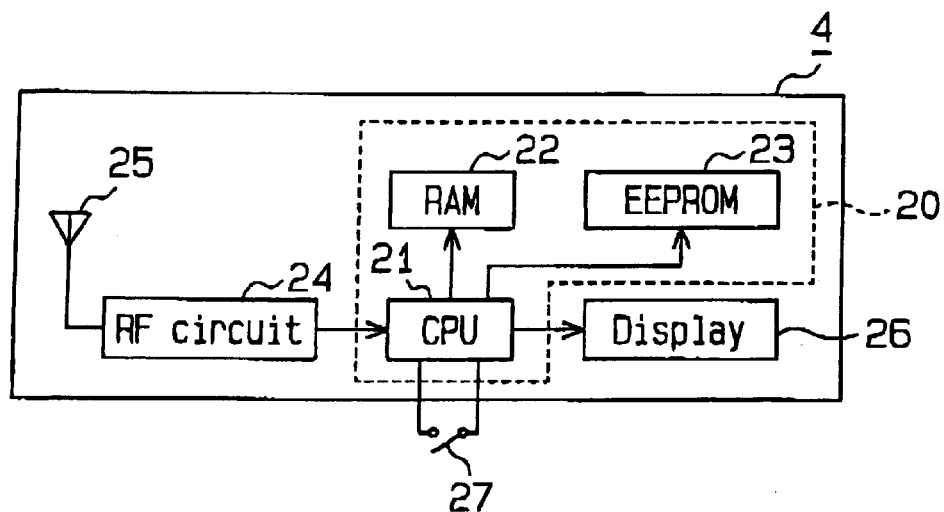
FIG. 3 is a block diagram illustrating a receiver in the system of FIG. 1.

As shown in FIG. 3, the receiver 4 has a controller 20, which includes a CPU 21, a RAM 22, an electrically erasable programmable read-only memory (EEPROM) 23, or non-volatile storage. An RF circuit 24 receives data transmitted from the transmitters 3 through a reception antenna 25 and sends the data to the CPU 21. Based on the ID code and pressure data contained in the received data, the CPU 21 obtains the internal pressure of the tire 2 corresponding to the transmitter 3 that has sent the data. The CPU 21 also displays information regarding the tire pressure and other data on a display 26. The display 26 is located in the view of the driver.

The CPU 21 stores an ID code contained in the received data into the EEPROM 23. An initializing switch 27, which is located at a position that can be reached by the driver, is used when registering ID codes in the EEPROM 23. The registration of ID codes by the initializing switch 27 will be described later.

Figure 4:
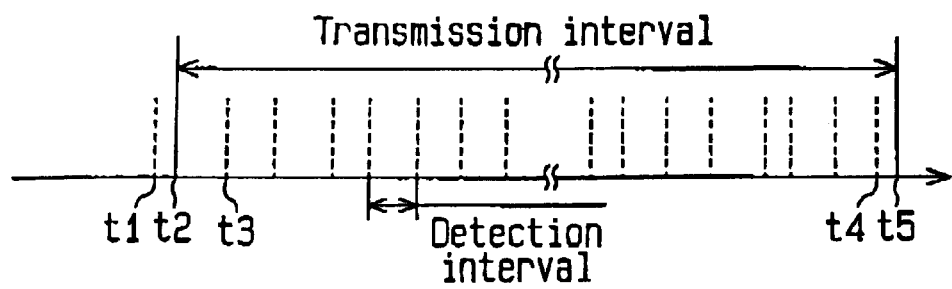
FIG. 4 is a timing chart showing signal intervals.

Operation of each transmitter 3 will now be described with reference to the timing chart of FIG. 4. If the count value of the counter 14 reaches forty when the pressure sensor 11 measures the pressure of the associated tire 2 at time t1, the transmitter 3 transmits data representing the measured pressure at time t2. On the other hand, the pseudorandom number generator 12 performs a pseudorandom calculation using the pressure data received at the time t1 and the ID code of the transmitter 3 for generating a delay time between zero and one second. The generated delay time is added to the basic detection interval, which is fifteen seconds. At time t3, at which the time corresponding to the sum of the basic detection interval and the delay time has elapsed, the pressure sensor 11 performs the next pressure detection. Therefore, the pressure detection at the time t1 and the pressure detection at the time t3 are spaced apart by a time interval between fifteen and sixteen seconds depending on the value of the pressure detected at the time t1.

As described above, the pressure sensor 11 repeatedly detects the pressure of the corresponding tire 2 at intervals between fifteen seconds and sixteen seconds. At time t4, at which the pressure 11 has detected the tire pressure forty times from the time t1, the count value of the counter 14 reaches forty again. At time t5, the transmitter 3 transmits the pressure value detected at the time t4. Therefore, the time period from the time t2 to the time t5 varies between a period computed by multiplying fifteen seconds by forty to a period computed by multiplying sixteen second by forty, or between 600 and 640 seconds.

As described above, the system of the illustrated embodiment randomly changes the time interval between pressure detections by the pressure sensor 11 based on the pseudo-random calculation using the pressure value detected by the pressure sensor 11 and the ID code of the transmitter 3. When the pressure detection, which is performed with randomly changed time intervals, has been performed a predetermined number of times, the pressure data is transmitted to the receiver 4. Thus, the transmission interval is random, which increases the number of variation in transmission intervals. Therefore, the likelihood that two or more transmitters 3 will have the same transmission timing is almost eliminated. Even if the transmission timing of two or more transmitters 3 match, the timing will be different at the next transmission.

The variation of the transmission intervals is determined based on the sum of the intervals between pressure detections. This system increases the variation of the transmission intervals compared to a case where the transmission intervals are varied without changing the detection intervals. Thus, the illustrated system further decreases the likelihood of two or more transmissions coinciding.

It is not necessary to differentiate the structure of the transmitters 3. For example, control programs for differentiating the transmission intervals of each transmitter 3 are not necessary. The transmitters 3 have the same structure, and the only difference is in the ID code, which simplifies the manufacture of each transmitter 3 and facilitates mass production.

Registration of ID codes of the transmitters 3 into the receiver 4 will now be described. The receiver 4 is activated when a key switch (not shown) of the vehicle 1 is turned on. If the initializing switch 27 is turned on when the receiver 4 is activated, an initial value setting routine of the flowchart of FIG. 5 is repeatedly executed until the switch 27 is turned off.

Figure 5:
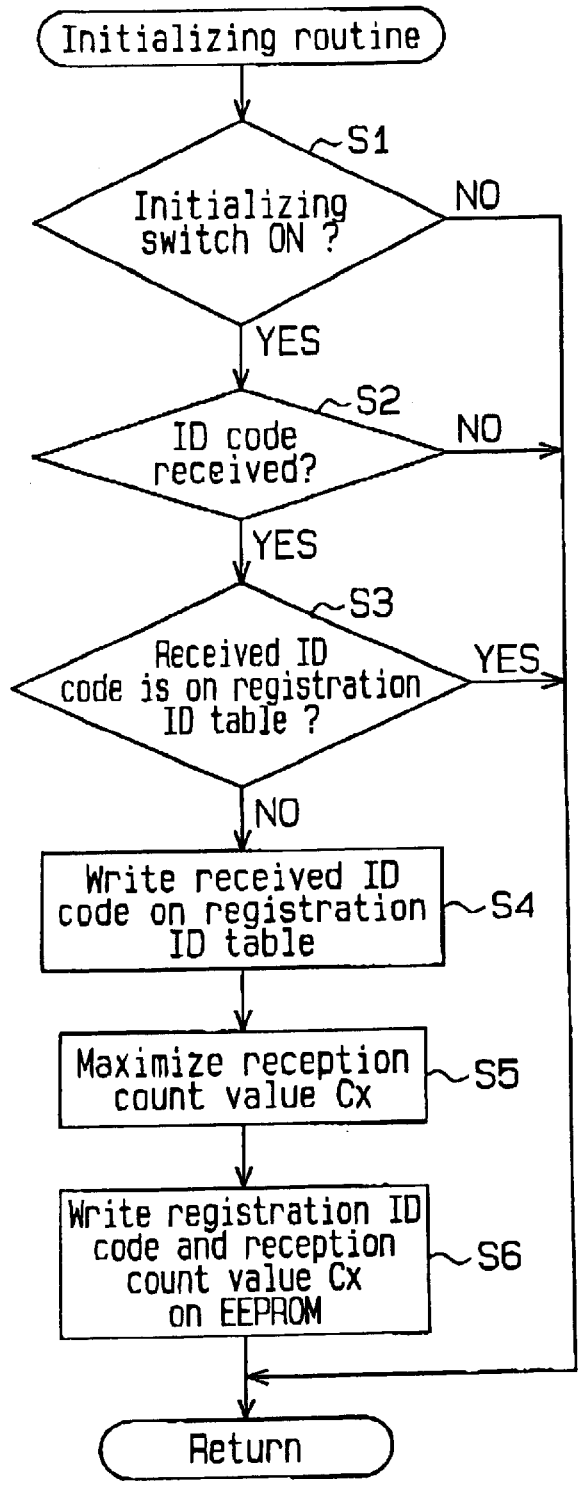
FIG. 5 is a flowchart showing an initializing routine executed by the receiver of FIG. 3.

As shown in FIG. 5, the CPU 21 judges whether the initializing switch 27 is turned on at step S1. If the switch 27 is not in the on position, the CPU 21 temporarily stops the routine. If the switch 27 is on, the CPU 21 moves to step S2 and judges whether an ID code from any transmitter 3 has been received. The CPU 21 temporarily stops the routine if no ID code has been received. If an ID code has been received, the CPU 21 moves to step 53 and judges whether the received ID code exists on a registration ID table in the RAM 22. If the received ID code is on the registration ID table in the RAM 22, the CPU 21 judges that the received ID code has been previously registered and temporarily stops the routine.

If the received ID code is not on the registration ID table in the RAM 22 at step S3, the CPU 21 judges that the received ID code has not been registered and moves to step S4. At step S4, the CPU 21 writes the received ID code on the registration ID table in the RAM 22 as a registration ID code. At the subsequent step S5, the CPU 21 sets a reception count value Cx, which will be described later, to a predetermined maximum value and writes the reception count value Cx into the RAM 22. The reception count value Cx is used to judge whether registration ID codes are valid.

At step S6, the CPU 21 writes the registration ID code, which was written in the RAM 22, and the reception count value Cx to the EEPROM 23 thereby renewing the registration ID code. The CPU 21 then temporarily stops the routine.

The vehicle 1 has the four transmitters 3, each corresponding to one of the four tires 2. Therefore, the registration ID table in the RAM 22 stores four different ID codes, each specific to one of the four transmitters 3. When the four ID codes are registered in the EEPROM 23, the initializing routine of FIG. 5 is terminated. While the CPU 21 is executing the initializing routine, the display 26 visually displays text information such as signs and numbers to indicate the registration ID codes. The operator performing the initialization can therefore see the registered ID code. If the same ID code is received more than once, a double registration is prevented. Instead, four ID codes, each corresponding to one of the four transmitters 3, are registered.

The EEPROM 23 is a non-volatile memory. Therefore, if the receiver 4 is disconnected from the power source when the key switch of the vehicle 1 is turned off, the data stored in the EEPROM 23 is not deleted. When the receiver 4 is turned on, the CPU 21 reads out all the information including four registration ID codes and the reception count value Cx stored in the EEPROM 23 and writes the information on the RAM 22.

A reception abnormality monitoring routine executed by the receiver 4 will now be described. The CPU 21 of the receiver 4 continuously monitors the reception intervals of each registration ID code while the key switch (not shown) of the vehicle 1 is at the on position. Based on the results of monitoring, the CPU 21 repeats the reception abnormality monitoring routine shown in the flowchart of FIG. 6.

At step S10, the CPU 21 judges whether there is any registration ID code that has not been received for a predetermined reference period. The reference period is determined based on the maximum transmission interval of the transmitters 3. For example, if the transmission interval of the transmitters 3 is 600 to 640 seconds, the measuring time is set to be equal to or greater than 640 seconds. When all the registration ID codes have been received within the reference period, the CPU 21 judges that there is no abnormality in the reception and temporarily stops the routine.

If there is a registration ID code that has not been received in the reference period, the CPU 21 moves to step S11 and decrements the reception count value Cx that corresponds the unreceived registration ID code. In a subsequent step S12, the CPU 21 clears the measuring time of the unreceived ID code and temporarily stops the routine. Thus, the reception interval of the unreceived ID code is measured again. If the measured time exceeds the reference period again, the reception count value Cx of the unreceived ID code is decremented again. If the reception count value Cx is renewed by the routine of FIG. 6, the renewed reception count value Cx is written on the EEPROM 23.

A normal reception routine executed by the receiver 4 will now be described. The CPU 21 of the receiver 4 repeats the normal reception routine of a flowchart of FIGS. 7(a) and 7(b) while the key switch (not shown) of the vehicle 1 is at the on position.

Figure 7A:
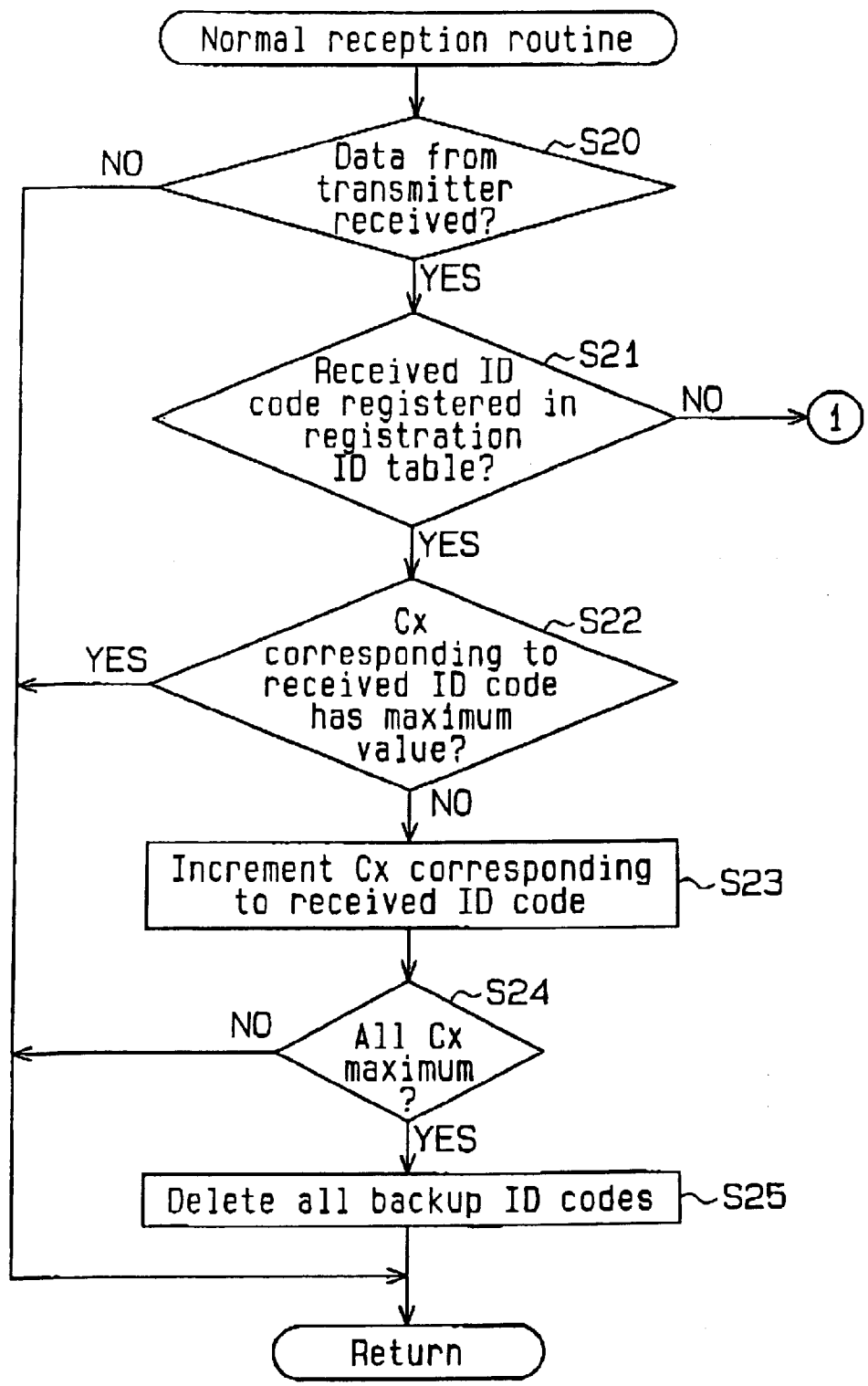
FIGS. 7(a) and 7(b) are flowcharts showing a normal reception routine executed by the receiver of FIG. 3.

At step S20 of FIG. 7(a), the CPU 21 judges whether data from any transmitter 3 is received. If the determination is positive, the CPU 21 moves to step 21 and judges whether the ID code in the received data is registered in the registration ID table in the RAM 22. If the ID code of the received data is registered in the registration ID table, the CPU 21 moves to step S22 and judges whether the reception count value Cx corresponding to the received ID code has the maximum value. If the reception count value Cx has the maximum value, the CPU 21 temporarily stops the routine. If the reception count value Cx does not have the maximum value, the CPU 21 moves to step S23 and increments the reception count value Cx corresponding to the received ID code.

Figure 7B:
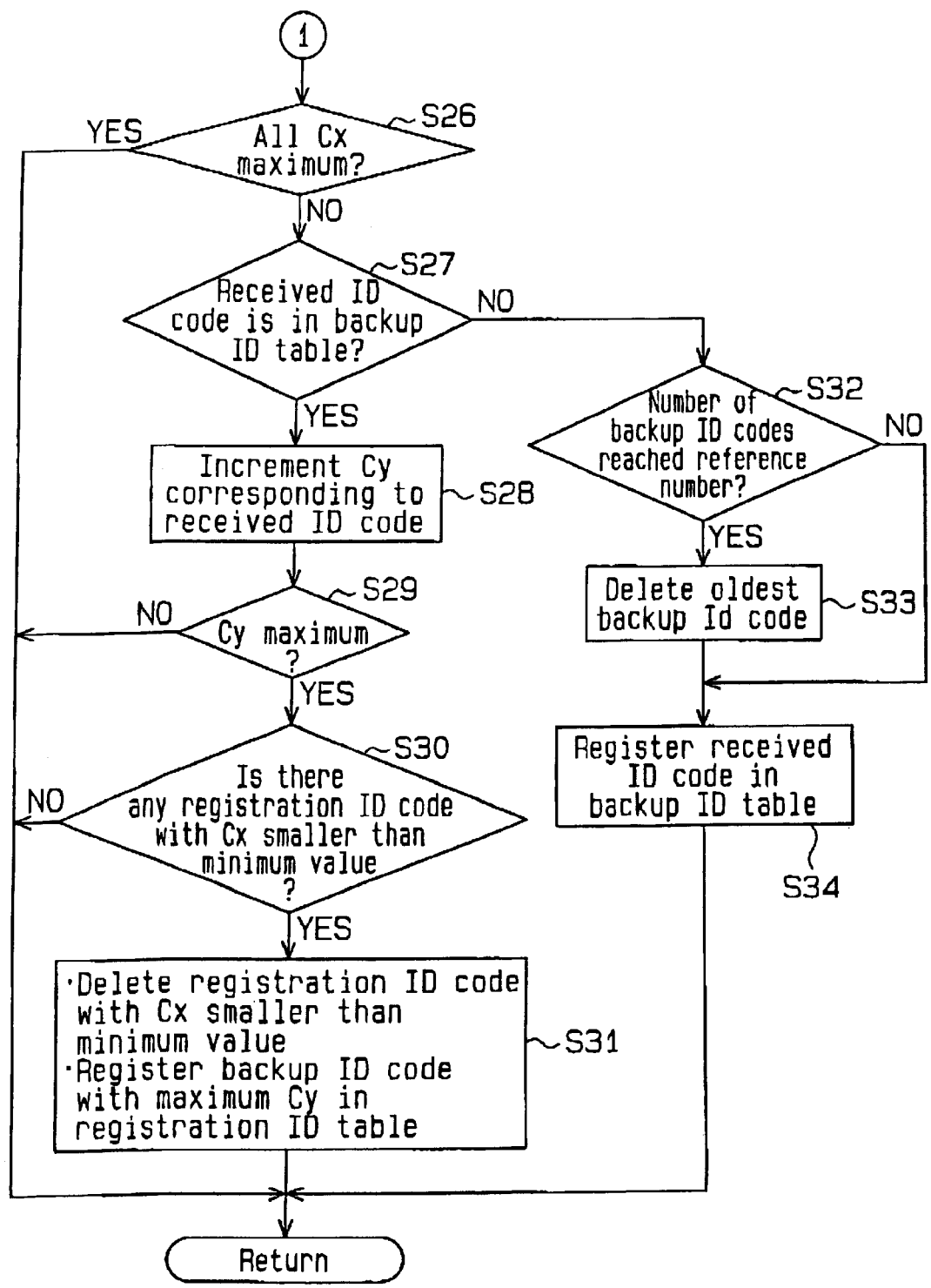

Although not shown in the flowcharts of FIGS. 7(a) and 7(b), if the received ID code is registered in the registration ID table in the RAM 22, the CPU obtains the tire pressure of the tire 2 corresponding to the transmitter 3 that sent the data based on the pressure data contained in the received data. The obtained air pressure is displayed on the display 26.

At the subsequent step S24, the CPU 21 judges whether the reception count values Cx of all the four registration ID codes have the maximum value. If there is one or more count values Cx that have not reached the maximum value, the CPU 21 temporarily stops the routine. If all the count values Cx have reached the maximum value, the CPU 21 assumes that the all the current registration ID codes are value and moves to step S25. The air pressure information based on the received data may be displayed when the determination is positive at step S24.

At step S25, the CPU 21 deletes all backup ID codes registered in a backup ID table in the RAM 22 and temporarily stops the routine. The backup ID codes, which will be described later, are registered in the backup ID table in the RAM 22 as candidates that are likely to replace ID codes in the registration ID table. If anyone of the ID codes in the registration ID table is not valid, the most suitable backup ID code in the backup ID table is selected to replace the invalid registration ID code.

If the ID code contained in the received data is not registered in the registration ID table in the RAM 22 at step S21, the CPU 21 moves to step S26 of FIG. 7(b) and judges whether all the reception count values Cx corresponding to the four registration ID codes are maximum. If all the reception count values Cx are maximum, the CPU 21 judges that the current registration ID codes are all valid and that the received ID code is not needed. In this case, the CPU 21 temporarily stops the routine. If any one of the reception count values Cx is not maximum, the CPU 21 moves to step S27.

At step S27, the CPU 21 judges whether the received ID code is in the backup ID table in the RAM 22. If the determination is positive, the CPU 21 moves to step 28 and increments a second reception count value Cy corresponding to the received ID code. At a subsequent step S29, the CPU 21 judges whether the second reception count value Cy has reached a predetermined maximum value. If the second reception count value Cy has not reached the maximum value, the CPU 21 temporarily stops the routine. If the second reception count value Cy has reached the maximum value, the CPU 21 moves to step S30.

At step S30, the CPU 21 judges whether there is any registration ID code corresponding to a reception count value Cx that is smaller than a predetermined smallest value. If there is no registration ID code corresponding to a reception count value Cx that is smaller than the predetermined smallest value, the CPU 21 temporarily stops the routine. If there is any registration ID code corresponding to a reception count value Cx that is smaller than the smallest value, the CPU 21 judges that the registration ID code is invalid and moves to step S31.

At step S31, the CPU 21 deletes the registration ID code corresponding to a reception count value Cx that is smaller than the smallest value from the registration ID table. Also, the CPU 21 judges that a backup ID code that corresponds to a second reception count value Cy that is maximum is valid and registers the valid backup ID code on the registration ID table as a new registration ID code. At this time, the reception count value Cx corresponding to the newly registered ID code is set to maximum. Also, the backup ID code that is newly registered on the registration ID table is deleted from the backup ID table.

If the received ID code is not in the backup ID table at step S27, the CPU 21 moves to step S32 and judges whether the number of the backup ID codes in the backup ID table has reached a predetermined reference number. If the number of the backup ID codes has reached the reference number, the CPU 21 moves to step S33 and deletes the one of the backup ID codes that was received the earliest. At the subsequent step S34, the CPU 21 registers the ID code received in the current routine in the backup ID table and temporarily stops the routine. If the number of the backup ID codes in the backup ID table has not reached the reference number at step S32, the CPU 21 moves to step S34 and registers the ID code received in the current routine in the backup ID table.

If the data in the RAM 22 is renewed in the routine of FIGS. 7(a) and 7(b), the renewed data is written in the EEPROM 23.

Figure 6:
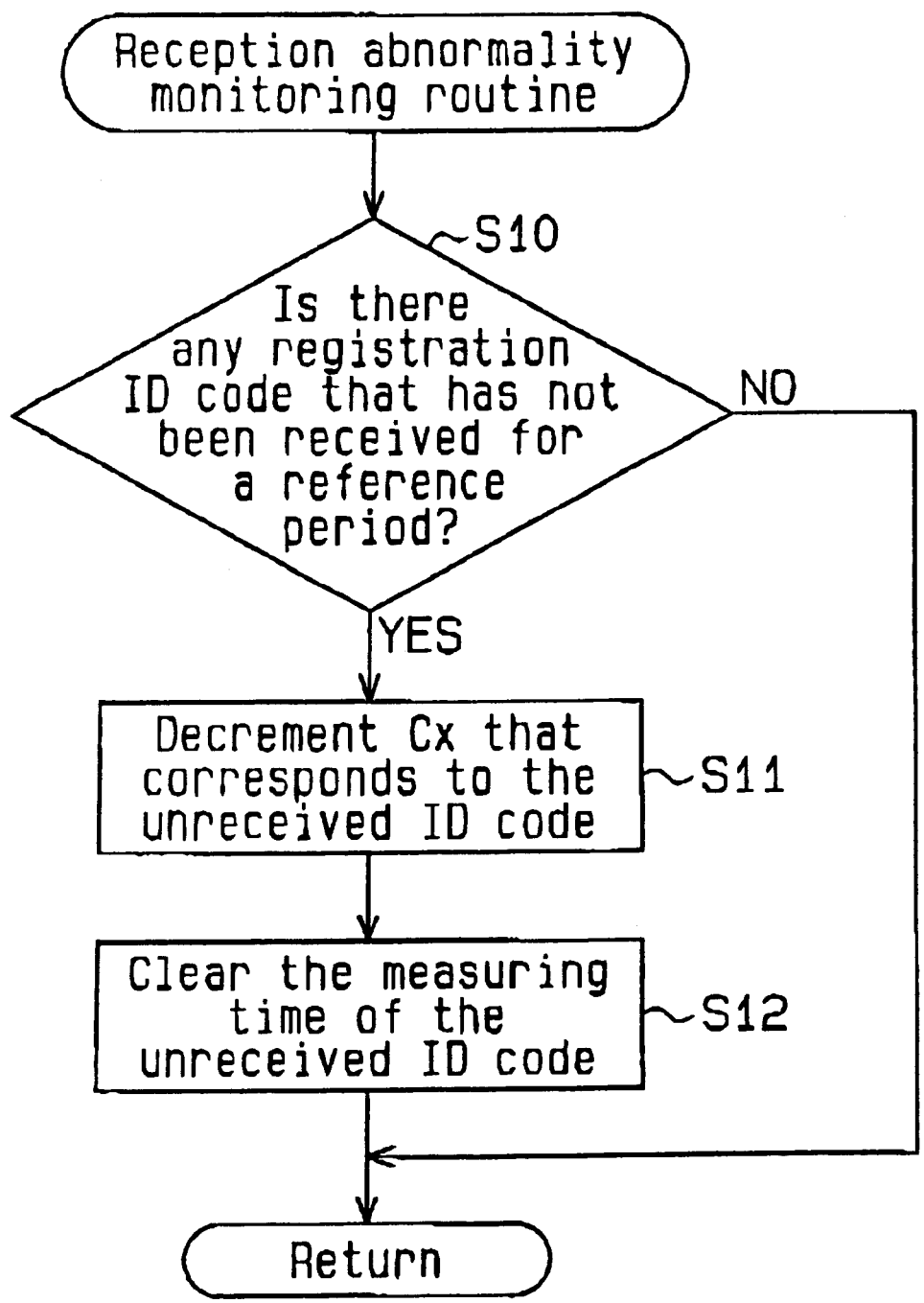
FIG. 6 is a flowchart showing a reception abnormality monitoring routine executed by the receiver of FIG. 3.

If the data from the transmitters 3 of all the tires 2 are normally received, all the reception count values Cx are maintained at maximum values and the count values Cx that correspond to the registration ID codes are not decremented as shown in FIG. 6. Therefore, if the ID codes in the received data are not included in the registration ID codes, step S26 is determined to be positive. That is, the received ID codes are judged to be unnecessary and are not registered as backup ID codes. Thus, if the receiver 4 receives data from transmitters of an air pressure monitoring system of another vehicle while, for example, the vehicle 1 is parked in a parking lot with the engine idling, the ID codes from the transmitters of the other vehicle are not registered as backup ID codes as long as the air pressure monitoring system of the vehicle 1 is functioning normally.

If the air pressure monitoring system of the vehicle 1 has a temporary malfunction in the wireless transmission system, ID codes from the transmitters of another vehicle may be registered as backup ID codes. However, the reception count value Cx are maximized again if the malfunction is corrected. Accordingly, the ID codes from the other vehicle are deleted (steps S24 and S25).

When an ID code from another vehicle is registered as a backup ID code, the registration ID codes will not be deleted unless the ID code from the other vehicle is received for a predetermined number of times and the registration ID codes are not received for a predetermined number of times (steps S29, S30, S31). Therefore, unless a transmitter 3 has a lasting malfunction, the registration ID codes are not easily deleted even if a malfunction in the wireless system of the vehicle 1 is not corrected in a short time. In other words, necessary registration ID codes are not easily replaced with unnecessary backup ID codes.

If one of the tires 2 is changed, the data from the transmitter 3 of the removed tire 2 does not reach the receiver 3. In this case, the reception count value Cx corresponding to the ID codes of the removed tire 2 is decremented according to the reception abnormality monitoring routine of FIG. 6. When the reception count value Cx becomes minimum, one of the conditions for deleting the registration ID code is satisfied (step S30).

Data from the transmitter 3 of a newly attached tire 2 is received by the receiver 4. The ID code in the received data is initially registered as a backup ID code (step S34), and the second reception count value Cy corresponding to the backup ID code is incremented (step S28). When the second reception count value Cy becomes maximum and the reception count value Cx becomes minimum, the conditions for replacing the registration ID code with the backup ID code are satisfied. At this time step S31 is executed.

In this manner, when one of the tires 2 is changed, the ID code of the removed transmitter 3 is automatically deleted from the registration ID codes, and the ID code of the newly attached transmitter 3 is automatically registered. Therefore, registering new ID codes requires no human effort or specially designed tools. Further, the illustrated system can accurately identify unnecessary ID codes to be deleted and can identify backup ID codes to replace the registration ID codes. The values of the registration ID codes are initialized by simply manipulating the initializing switch 27 located in the receiver 4, which facilitates the operation.

When one of the tires 2 is changed, a backup ID code that corresponds to the new tire 2 is registered instead of the registration ID code of the removed tire 2. In other words, the position of the receiver 3 corresponding to the new registration ID code corresponds to the position of the removed tire 2. Thus, the positions of the tires 2 in relation to the registration ID codes are not changed by changing the tires 2.

When there is a lasting malfunction in any of the transmitters 3, the corresponding reception count value Cx becomes minimized while there is no backup ID code or before the second reception count value Cy corresponding to the backup ID code has reached the maximum value. This permits the operator to easily know which of the transmitters 3 has the lasting malfunction.

The illustrated embodiment may be changed as follows.

In the illustrated embodiment, the detection interval of the pressure detection by the pressure sensor 11 is obtained by adding the delay time computed by pseudorandom number computation to the basic detection interval. However, the detection interval may be obtained by subtracting a time computed by pseudorandom number computation from the basic detection interval. Alternatively, the detection interval may be directly obtained by a pseudorandom number computation.

In the illustrated embodiment, the detection interval is calculated by a pseudorandom calculation using the ID code of the transmitter 3 and the detection value of the pressure sensor 11. However, the detection interval may be calculated by a pseudorandom calculation using only the detection value of the pressure sensor 11.

Therefore, the present examples and embodiments are to be considered as illustrative and not restrictive and the invention is not to be limited to the details given herein, but may be modified within the scope of the equivalence of the appended claims.

What is claimed is:

1. A transmitter for wirelessly transmitting data regarding the inner pressure of a tire, comprising:
   a pressure sensor for measuring the inner pressure of the tire;
   transmitting means for wirelessly transmitting data including the measured pressure;
   first commanding means for commanding the pressure sensor to measure the pressure, wherein, every time the pressure sensor measures the pressure, the first commanding means obtains a time interval based on a pseudorandom number calculation using at least data representing the pressure measured by the pressure sensor, and wherein the first commanding means commands the pressure sensor to measure the pressure after the computed time interval has elapsed; and
   second commanding means for commanding the transmitting means to wirelessly transmit the data every time the pressure sensor measures the pressure for predetermined number of times.

2. The transmitter according to claim 1, wherein the transmitter has its own ID code, and the data wirelessly transmitted by the transmitting means represents at least the pressure measured by the pressure sensor and the ID code, and wherein the first commanding means performs the pseudorandom number calculation using the data representing the pressure measured by the pressure sensor and the ID code.

3. The transmitter according to claim 1, wherein the pseudorandom number calculation generates a random delay time, and the first commanding means adds the random delay time to a predetermined time period and sets the resultant sum as the measuring time interval.

4. A method for wirelessly transmitting data regarding the inner pressure of a tire from a transmitter, comprising:
   measuring the inner pressure of the tire at random time intervals, wherein, each time interval is generated based on a pseudorandom number calculation using at least data representing the measured pressure, and wherein the pressure is measured when each time interval elapses; and
   wirelessly transmitting data including the measured pressure every time the pressure is measured for predetermined number of times.

5. The method according to claim 4, wherein the transmitter has its own ID code, and the data wirelessly transmitted by the transmitter represents at least the measured pressure and the ID code, and wherein the pseudorandom number calculation is performed using the data representing the measured pressure and the ID code.

6. A tire air pressure monitoring apparatus having a plurality of transmitters for wirelessly transmitting data regarding the inner pressures of respective vehicle tires and a receiver for receiving the data wirelessly transmitted by the transmitters, wherein each transmitter has its own ID code, and wherein the data transmitted from each transmitter represents at least the measured pressure and the ID code, the apparatus comprising:
   a memory located in the receiver, wherein the memory includes a registration ID table for registering the ID codes of the transmitters and reception count values, each reception count value corresponding to one of the ID codes, wherein each reception count value is used for judging whether the corresponding ID code registered in the registration ID table is valid;
   an initializing switch connected to the receiver, wherein the initializing switch is manipulated for initially registering the ID codes, which are contained in data received by the receiver, in the registration ID table; and
   a controller located in the receiver, wherein, when a registration based on the manipulation of the initializing switch is performed, the controller sets each reception count value, which corresponds to one of the initially registered ID codes, to predetermined maximum count value.

7. The monitoring apparatus according to claim 6, wherein each transmitter transmits data at predetermined time intervals, and wherein, when any of the ID codes, which have been registered in the registration ID table, is not received for a predetermined reference period, the controller decrements the reception count value corresponding to the unreceived ID code.

8. The monitoring apparatus according to claim 7, wherein, when any of the reception count values reaches a predetermined minimum count value, the controller judges that the corresponding ID code is invalid.

9. The monitoring apparatus according to claim 8, wherein the memory has a backup ID table for storing backup ID codes, and wherein the backup ID codes are different from the ID codes that have been registered in the registration ID table.

10. The monitoring apparatus according to claim 9, wherein the maximum number of backup ID codes stored in the backup ID table is predetermined, and, if an ID code that is not included in the registration ID table or in the backup ID table is received after the number of backup ID codes stored in the backup ID table reaches the predetermined maximum number, the backup ID code that was received earliest is deleted from the backup ID table.

11. The monitoring apparatus according to claim 9, wherein, when an ID code that is the same as one of the backup ID codes stored in the backup ID table has been received for a predetermined maximum number of times, the controller judges that the backup ID code is valid.

12. The monitoring apparatus according to claim 11, wherein, when one of the reception count values becomes less than or equal to the predetermined minimum count value and an ID code that matches one of the backup ID codes stored in the backup ID table has been received for the predetermined maximum number of times, the controller deletes the ID code corresponding to the reception count value that is less than or equal to the minimum count value from the registration ID table and newly registers the backup ID code that has been received for the maximum number of times in the registration ID table.

13. The monitoring apparatus according to claim 12, wherein the controller sets the reception count value corresponding to the newly registered ID code to the maximum count value.

14. The monitoring apparatus according to claim 9, wherein, when an ID code corresponding to a reception count value that is smaller than the maximum count value is received, the controller increments the corresponding reception count value.

15. The monitoring apparatus according to claim 14, wherein, when the reception count values corresponding to all the ID codes stored in the registration ID table have been incremented to the maximum count values, the controller deletes all the backup ID codes from the backup ID table.

* * * * *